United States Patent [19]
Kidder et al.

[11] Patent Number: 5,903,735
[45] Date of Patent: May 11, 1999

[54] METHOD AND APPARATUS FOR TRANSMITTING DATA HAVING MINIMAL BANDWIDTH REQUIREMENTS

[75] Inventors: Jeff Kidder, Hillsboro; Robert Adams, Lake Oswego, both of Oreg.

[73] Assignee: Intel Corporation, Santa Clara, Calif.

[21] Appl. No.: 08/777,960

[22] Filed: Dec. 24, 1996

[51] Int. Cl.$^6$ ............................... H04J 3/26; G06F 13/00
[52] U.S. Cl. ................... 395/200.7; 395/200.62; 370/468; 370/233; 370/389
[58] Field of Search ........ 340/825.05; 342/201; 370/233, 431, 412, 389, 466, 468; 395/200.7, 200.62

[56] References Cited

U.S. PATENT DOCUMENTS

| | | | |
|---|---|---|---|
| 4,459,588 | 7/1984 | Grow | 340/825.05 |
| 4,538,147 | 8/1985 | Grow | 342/201 |
| 5,132,966 | 7/1992 | Hayano et al. | 370/233 |
| 5,367,517 | 11/1994 | Cidon et al. | 370/431 |
| 5,463,620 | 10/1995 | Sriram | 370/412 |
| 5,636,212 | 6/1997 | Ikeda | 370/233 |
| 5,748,629 | 5/1998 | Caldara et al. | 370/389 |
| 5,764,645 | 6/1998 | Bernet et al. | 370/466 |

OTHER PUBLICATIONS

RSVP Protocol Overview, Nov. 8, 96, p. 1.
RSVP: A New Resource ReSerVation Protocol, IEEE Network, Sep. 1993, pp. 8–18.

*Primary Examiner*—Krisna Lim
*Attorney, Agent, or Firm*—Blakely, Sokoloff, Taylor & Zafman

[57] ABSTRACT

A method and apparatus of transmitting time critical messages over a network is provided. Data which has minimal bandwidth requirements, such as data packets utilized in applications such as twitch games, is received or generated in a network device. The data is classified as minimal bandwidth data and prioritized relative to other data for transmission before the other data. The data is then transmitted by the device to a second device on the network before the other data is transmitted.

21 Claims, 7 Drawing Sheets

METHOD AND APPARATUS FOR TRANSMITTING DATA HAVING MINIMAL BANDWIDTH REQUIREMENTS

FIELD OF THE INVENTION

The present invention relates generally to the field of computer networking, and more particularly to the reservation of network resources for low bandwidth messages requiring minimum transmission latency.

BACKGROUND OF THE INVENTION

Certain computer applications, such as dynamic simulations and "twitch" games require time-critical user input and computer response. Twitch games are a class of computer games exemplified by fighting or combat games in which a user controls a character and inputs movement and firing or hitting commands at a high rate. Twitch games are characterized by a high degree of user interaction, and since user input is on the order of seconds or fractions of a second, this input requires immediate registration and response from the computer in order to maintain the playability and realism of the game. Twitch games thus require the user to respond quickly to computer signals, and the computer to quickly respond to user input. Any delay by the computer to the user input would thus result in the improper flow or execution of the game or simulation.

Twitch games are also characterized by the transmission of messages of a small size and of only a few different types. Users of twitch games input commands through a device such as a joystick or keypad. These devices typically allow only a limited number of commands, such as lateral and vertical movement and various punching, kicking and firing commands as required by the games. Because the commands invoke relatively non-complex responses from the computer, the commands can be encoded within messages of a small size. For example, in a typical twitch game the command to fire a gun can be encoded and sent in a command word requiring only 8-bits.

Many computer games and simulation programs were originally written for and executed on single computer consoles such as arcade machines. These machines typically allow for player against computer, or multi-player play through multiple input devices on the console. With the growth of personal computer use and network access, however, many computer games are increasingly being played between players on personal computers over a network or modem link.

Although use of general purpose computer networks for the execution of real-time and time critical applications has increased, these networks are typically ill-suited for such applications because of transmission protocols that introduce an unacceptable degree of network latency. Latency is the minimum time required to transmit a packet through the network devices and lines constituting the network. A primary determinant of the latency of a network is the amount of transmission bandwidth available in each network device. As the complexity of a network and the amount of traffic over a network increases, this bandwidth is consumed and latency correspondingly increases. For many applications, increased latency results in slower transmission which does not jeopardize program execution. However for applications such as twitch games, increased latency could render a game or simulation unplayable.

One approach to playing twitch games over a computer network has been to utilize special low latency networks specifically designed for real-time and time critical applications. This approach has the disadvantage of being expensive and impractical for casual users. A second approach has been to dedicate a general purpose transmission medium to the time-critical application. This method may provide sufficient bandwidth for the application, but typically requires that no other application transmit messages over the network at the same time. This approach thus denies the use of the network to general purpose traffic while a game or simulation is being played.

It is thus desirable to provide a method of executing time-critical computer applications, such as twitch games, over general purpose networks without the network latency associated with such networks. One of the primary general purpose networks gaining widespread use is the Internet. Messages are transmitted over the Internet using the Transmission Control Protocol/Internet Protocol (TCP/IP). The TCP/IP protocol is based on the principle of "best effort" transmission between entities on the network. Messages on the Internet are non-prioritized and implement collision mechanisms in order to reach their destination. Because of the non-deterministic nature of TCP/IP message transmission, the Internet is not well suited to applications requiring time-critical response.

A recent extension to TCP/IP protocol has introduced the concept of reservation of network resources within individual network devices on the Internet as an attempt to facilitate the execution of real-time applications across the Internet. Such resources include memory and buffer space within computers and routers on the network. The reservation of such resources provides adequate network bandwidth for deterministic transmission of application messages which require time-critical response. However, present reservation protocols do not provide priority queuing for small data packets which require extremely low latency transmission but do not require substantial network bandwidth. Therefore, what is further needed is a mechanism for extending resource reservation protocols to accommodate the prioritization of low bandwidth, minimum latency messages of small packet sizes.

SUMMARY OF THE INVENTION

The present invention discloses a method and apparatus for transmitting small, time critical messages through a network channel with reduced latency. A host computer generates data which has minimal bandwidth requirements. The host classifies the data as minimal bandwidth data and prioritizes the data relative to other data for transmission before the other data. The host then transmits the data to a second device on the network before transmitting the other data.

In one embodiment of the present invention, the minimal bandwidth data is received by the second device which determines the classification of the data. If the data requires minimal bandwidth transmission, the second device prioritizes the data relative to other data and transmits the data to the next network device before transmitting the other data.

In a further embodiment of the present invention, resources within the host and routers which transmit the minimal bandwidth data are reserved by a resource reservation protocol. This protocol includes an extension which classifies the data as requiring minimal bandwidth and prioritizes the data in the data transmission queues of the hosts and routers.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
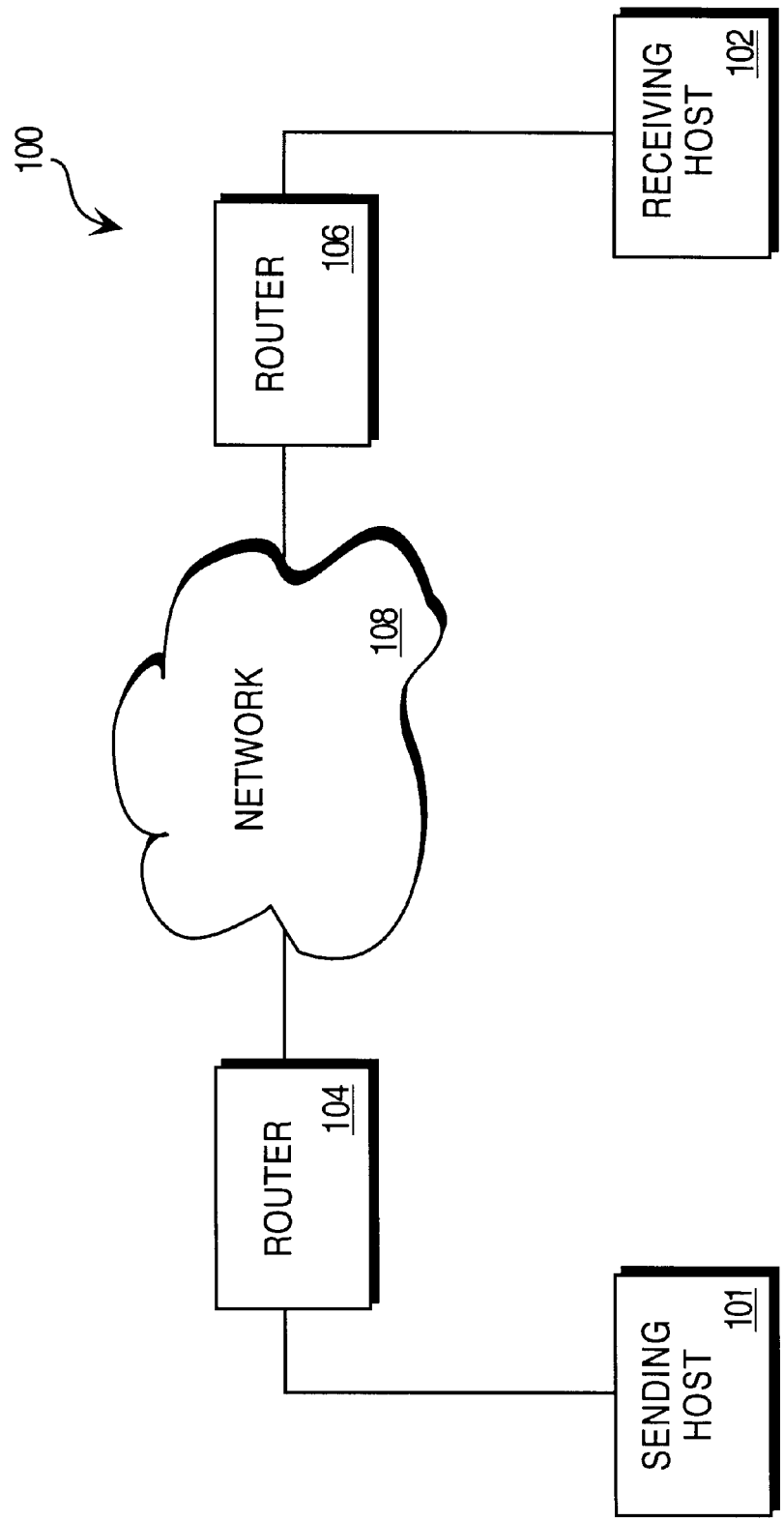
FIG. 1 illustrates a network including hosts sending and receiving bandwidth reservation messages.

A method and apparatus for routing messages of a small packet size through a low bandwidth, minimum latency network path is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form to facilitate explanation.

Hardware Overview

According to the present invention, host computer systems and routers in a network are used to transmit messages using a guaranteed Quality of Service protocol. Quality of Service provides firm bounds on end-to-end message queuing delays. This service makes it possible to provide a service that guarantees both transmission delay and network bandwidth. As will be described below in detail, the present invention includes an extension to a network resource reservation protocol for the transmission of small packet size messages through a reserved resource network.

According to one embodiment, the resource reservation and message transmission and other aspects of the present invention are implemented by a central processing unit (CPU) in a host computer or a network router executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention.

The instructions may be loaded into the memory of the host computer or router from a persistent store and/or from one or more other host computer systems over a network connection. For example, a source host computer may transmit a sequence of instructions to a target host computer in response to a message transmitted to the source host over a network by the target host. As the target host receives the instructions over the network connection, the target host stores the instructions in memory. The target host may store the instructions for later execution or execute the instructions as they arrive over the network connection. In some cases, the downloaded instructions may be directly supported by the CPU. Consequently, execution of the instructions may be performed directly by the CPU. In other cases, the instructions may not be directly executable by the CPU. Under these circumstances, the instructions may be executed by causing the CPU to execute an interpreter that interprets the instructions, or by causing the CPU to execute instructions which convert the received instructions to instructions which can be directly executed by the CPU.

In other embodiments, hardwired circuitry may be used in place of, or in combination with, software instructions to implement the present invention. Thus, the present invention is not limited to any specific combination of hardware circuitry and software, nor to any particular source for the instructions executed by the target.

FIG. 1 illustrates a network system 100 in which Resource Reservation Protocol (RSVP) is implemented. The RSVP protocol is defined in detail in the Internet draft-standard, "Resource Reservation Protocol (RSVP)—Version 1 Functional Specification," May 6, 1996. Although the present invention is henceforth described in terms of RSVP, it should be recognized that the present invention is not limited to use with RSVP or any other particular resource reservation protocol. Further, the present invention is not necessarily limited to the context of performing resource reservations.

In FIG. 1, it is assumed that a sending host 101, and a receiving host 102 each implement RSVP. The sending host 101 is coupled to the network 108 by a router 104. Similarly, receiving host 102 is coupled to the network 108 by router 106. The network 108 may be the Internet, a Wide Area Network (WAN), a local area network (LAN), or any combination thereof. The sending host 101 transmits PATH messages across network 108 to the receiving host 102. The PATH messages contain information required by the receiving host 102 to allow the receiving host 102 to make bandwidth reservation requests. These bandwidth reservation requests are sent by the receiving host 102 to the sending host 101 in the form of reserve (RESV) messages, which propagate, in one implementation, along the same path to the sending host 101 as taken by the PATH messages.

Figure 2:
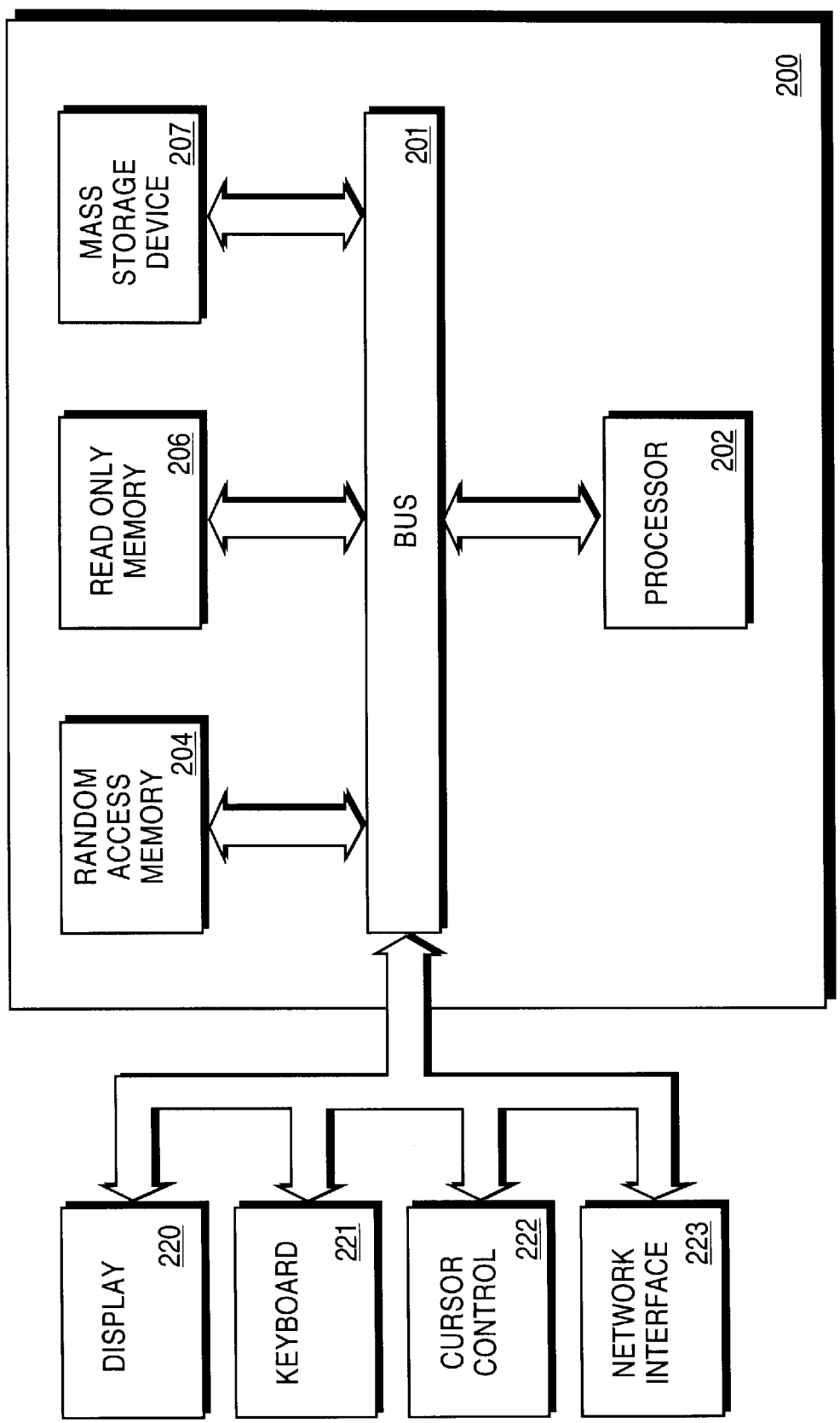
FIG. 2 is a block diagram of a computer system which may be used to implement an embodiment of the present invention.

FIG. 2 illustrates a block diagram of a host computer in the network of FIG. 1. The architecture depicted in FIG. 2 is also applicable to a network router used in conjunction with the present invention. The computer system 200 includes a processor 202 coupled through a bus 201 to a random access memory (RAM) 204, a read only memory (ROM) 206, and a mass storage device 207 such as a disk or tape drive for storing data and instructions. An alphanumeric input device 221, such as a keyboard, is coupled to bus 201 for communicating information and command selections to processor 202. Another type of user input device is cursor control unit 222, such as a mouse or joystick, for communicating direction commands which control cursor movement on display 220, which is also coupled to processor 202 through bus 201. If computer system 200 is implemented in a host computer, the network interface 223 provides a network connection. This connection is typically to a network router, but can also be directly to another host computer. If computer system 200 is implemented in a router, the network interface 223 provides a network interface to a host computer or another router. Note that the architecture of FIG. 2 is provided only for purposes of illustration, and that a host computer or a router used in conjunction with the present invention is not limited to this specific architecture.

Resource Reservation

The present invention includes a reservation protocol for the reservation of network resources within routers for twitch packets transmitted over the network. Twitch packets are generated and utilized by time critical applications such as computer action games or real-time simulations. Because twitch packets are used in time-critical applications, they require a specialized quality of service when transmitted over a network. The current Internet architecture embodied in the Internet Protocol (IP) network protocol offers simple point-to-point best-effort service. This best-effort service is typically inadequate for the transmission of twitch packets because of network latencies and the indeterminacy of network transmissions. For a network to provide the appropriate quality of service, or bound on delay, it must allow for the data traffic streams (flows), to reserve network resources. Such resources could include a share of the bandwidth or a number of buffers within the routers.

Twitch packets are characterized by small packet size, typically on the order of 100 bits or less. Moreover, twitch packets are typically generated and sent for a limited number of commands within an application. For example, in an action game, twitch packets are used to encode commands for character movement and hitting action, all other game commands are non-twitch commands which do not require transmission via a guaranteed quality of service. Thus, twitch packets lend themselves to a reservation protocol which reserves a channel for the transmission of small packets of a limited number of types. For a network to deliver a quantitatively specified quality of service to a particular flow, it is usually necessary to set aside certain resources, such as a share of bandwidth or a number of buffers for that flow, within routers along the flow path.

The special handling required by twitch packets to ensure that they are transmitted with as little latency as possible requires that the hosts and routers on the transmission route set up a specialized quality of service. Implementation of this specialized quality of service requires communication between each of the hosts and routers comprising the network over which the twitch packets will be transmitted. Such communication among the network elements could be implemented through the transmission of special messages between each of the network elements, or a separate wire connection between each of the elements for notification of special handling requirements. Other embodiments include implementation of a proprietary message protocol for encoding and transmitting twitch packets between network elements, or extending existing protocols to include special handling mechanisms for twitch packets.

Figure 3:
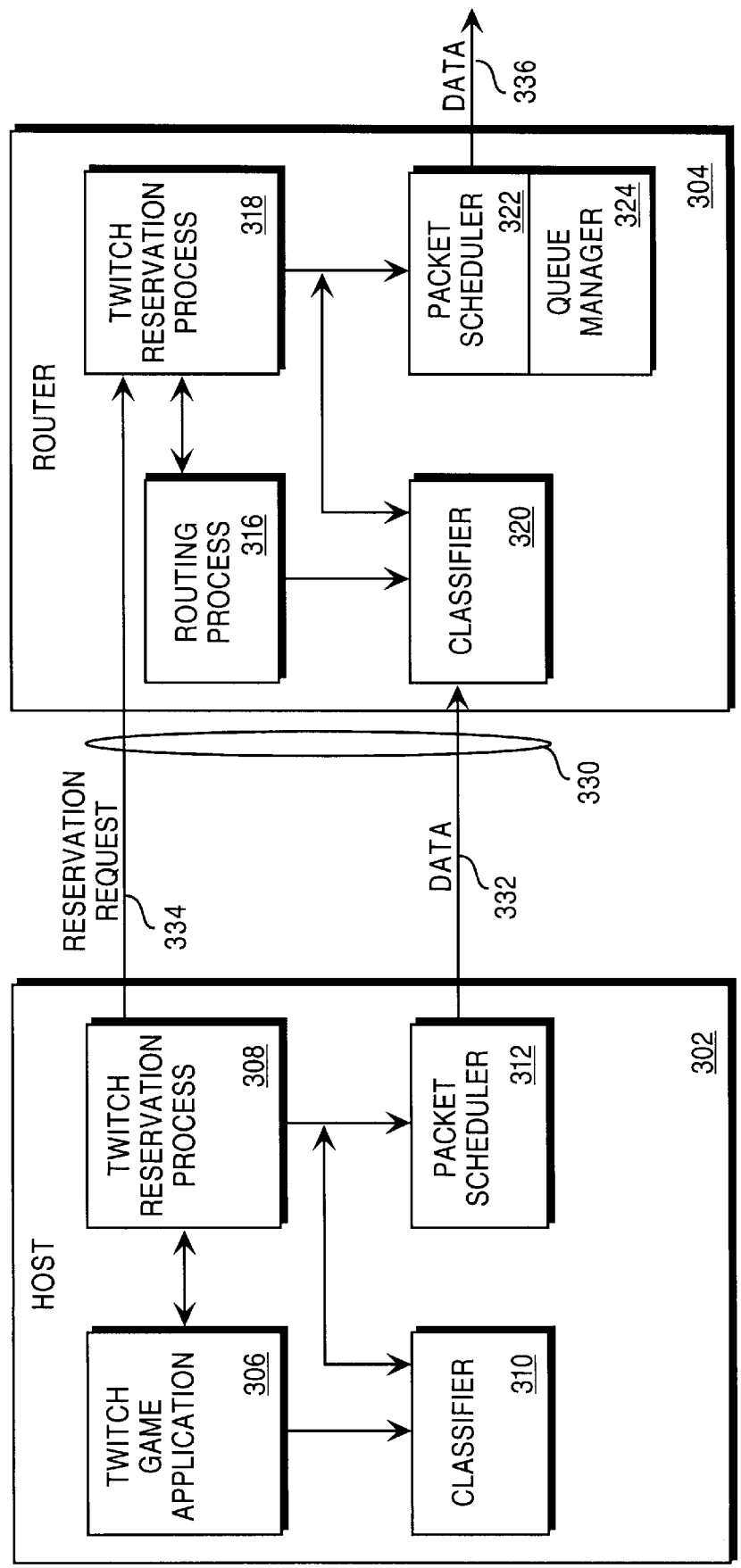
FIG. 3 illustrates a software module used to request a twitch enabled RSVP channel.

FIG. 3 illustrates a host computer and network router which implement a reservation protocol for twitch packets according to one embodiment of the present invention. Host 302 is coupled to router 304 through network line 330. Twitch game application 306 running on host 302 generates twitch packets. Twitch game application 306 communicates to the network through twitch reservation process 308 and classifier 310. Classifier 310 marks packets specified by twitch game application 306 as twitch packets. Classifier 310 is coupled to packet scheduler 312 which places twitch packets classified by classifier 310 at the beginning of the transmission queue within host 302. Host 302 transmits a reservation request to twitch reservation process 318 in router 304 over reservation request line 334. Twitch reservation process 318 within router 304 sends a reservation request to routing process 316 which is coupled to classifier 320 within router 304. Twitch reservation process 318 also sends a reservation request to packet scheduler 322 within router 304.

Data is sent from packet scheduler 312 from host 302 over data line 332 to classifier 320 in router 304. Data packets which have been marked as twitch packets are then sent to the front of the transmission queue by a queue management process within packet scheduler 322 in router 304. Twitch packet data is then sent from router 304 over output data line 336 from packet scheduler 322 in router 304 to the next downstream hop in the network.

The twitch enabled host and router thus operate as follows: twitch game application 306 generates twitch packets, and twitch reservation process 308 within host 302 sends a twitch packets to classifier 310. Twitch packets within the host are classified as twitch packets and scheduled to the front of the queue in packet scheduler 312. These packets are then sent to the next downstream hop, in this case router 304. Classifier 320 in router 304 decodes data packets according to twitch packet characteristics. The packet scheduler 322 in router 304 gives twitch packets priority to the front of the queue in router 304. Thus, twitch packets are classified within classifiers 310 and 320 and scheduled at the front of the respective queues by packet schedulers 312 and 322. In this manner, packets transmitted along twitch enabled routers and hosts are classified and given priority at the front of transmission queues and thereby transmitted with lower delay than normal network traffic.

Twitch reservation processes 308 and 318 in host 302 and router 304 respectively, reserve network bandwidth within hosts and router elements in a network. The twitch reservation process specifies the maximum size of each twitch packet to be transmitted from the host or router and specifies the maximum number of twitch packets to be sent in a unit of time. These specifications are transmitted from one twitch reservation process to the next twitch reservation process, along reservation request line 334. Twitch reservation processes in a downstream router respond by reserving network resources within the router such as buffers or share of bandwidth in response to the reservation request, and reserves resources to the extent available for packets of the specified size and the specified number. Twitch packets possessing the appropriate classification ID type are transmitted from and between twitch enabled routers without requiring IP protocol headers. Packet scheduler 322 within router 304 includes a queue manager unit 324. Queue manager unit 324 controls the queuing and transmission of data from router 304. Queue manager 324 prioritizes data traffic received from upstream hops, prioritizes control traffic, and prioritizes twitch traffic. Upon receiving packets classified as twitch packets by twitch reservation process 318 and classifier 320, the packet scheduler 322 and queue manager 324 place twitch packets in a higher priority queue than data packets and control traffic.

Standard queuing algorithms familiar to those skilled in the art could be utilized to implement priority queuing within packet scheduler 322. Such queuing algorithms should increase the priority of twitch packets as compared to regular data and control traffic and they should also prevent queue overflow and starvation of upstream hops. Standard queuing algorithms could also be utilized to implement flow control within packet scheduler 322 or queue manager 324. One such algorithm is a "leaky bucket" algorithm which enables a device to act as a stable buffer by providing a constant rate outflow for variable rate inflow.

In one embodiment, packet scheduler 322 and queue manager 324 implement an algorithm which reduce buffer requirements for small packet size twitch packets and reserve buffers only in the number specified by twitch reservation process 308 in the downstream hop. This dynamic buffering arrangement helps offset the cost of the router in providing network resources to the higher priority queuing given to twitch packets.

The packet and queue management elements within the host and router devices may also include mechanisms which facilitate special handling of the twitch packets between network hops. Such special handling could include functions such as bundling multiple twitch packets in a single packet to be sent as one packet to the next upstream hop, or compressing twitch packets for even greater transfer efficiency. One extension to the twitch protocol includes an option to bundle twitch packets for simultaneous transmission. Within a host or router, twitch packets which are to be bundled are tagged by the classifier, grouped by the packet scheduler, and prioritized and transmitted as a bundle by the queue manager.

Similarly, a second extension to the twitch protocol includes an option to compress twitch packets for compressed transmission. Twitch packets which are to be compressed are tagged by the classifier, compressed by a compression element within the host or router, and prioritized and transmitted by the packet scheduler and queue manager. A host or router which receives compressed twitch packets may also contain a decompression element for decompressing the compressed twitch packets. Standard compression algorithms familiar to those skilled in the art could be utilized to implement the compression and decompression functions.

Figure 4:
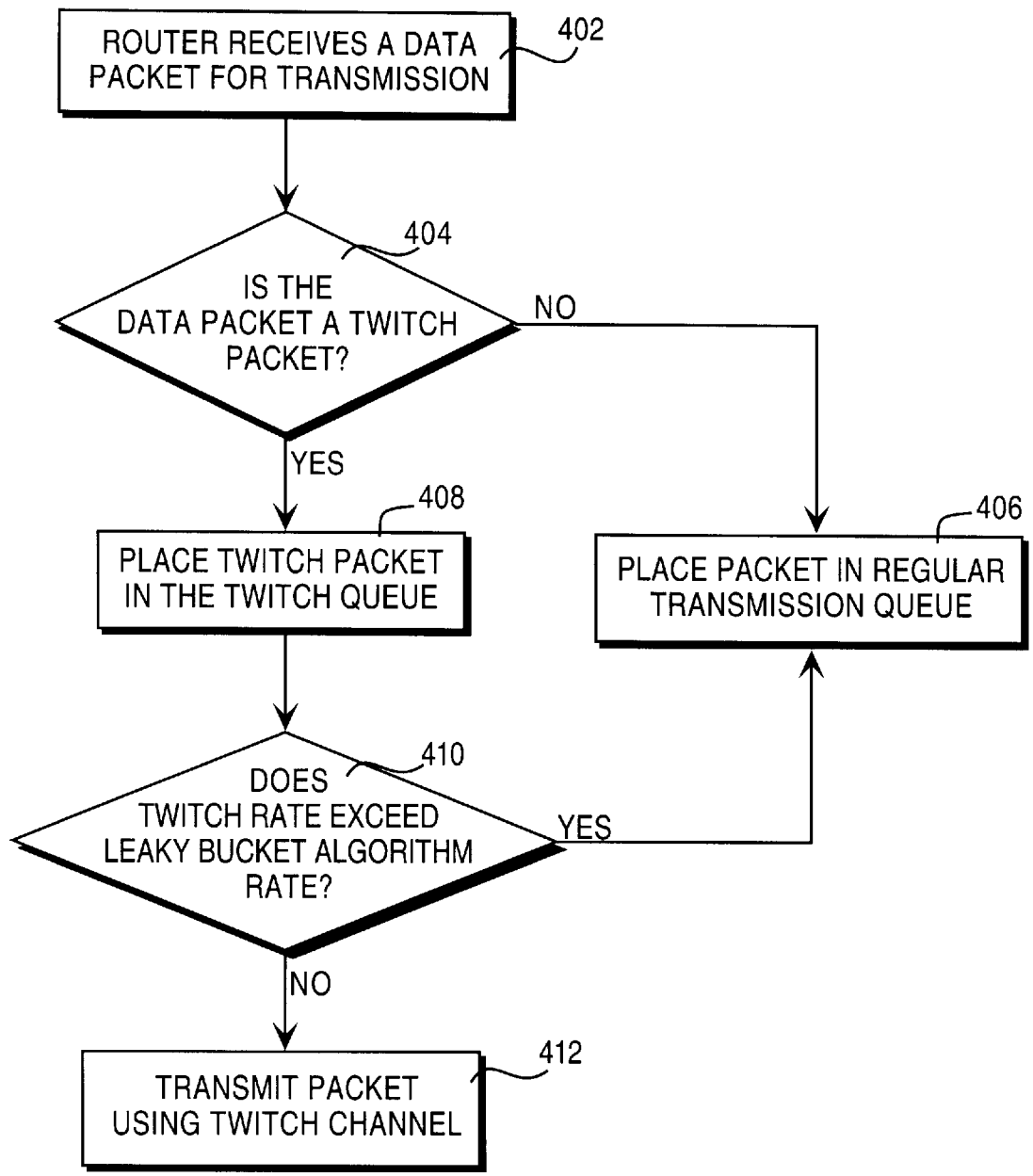
FIG. 4 is a flow chart illustrating the transmission of a twitch packet through a twitch enabled RSVP channel.

FIG. 4 is a flow chart which illustrates the transmission of a twitch packet over a network consisting of a twitch enabled host and a twitch enabled router as shown in FIG. 3. In step 402, the router 304 receives a data packet from host 302 for transmission to a downstream hop. In step 404, the classifier 320 within router 304 checks whether the data packet is a twitch packet, if the data packet is not a twitch packet, the data packet is placed in the regular data transmission queue by packet scheduler 322. That packet is then sent out on data line 336 in the regular queue order in step 406. If the packet is a twitch packet, packet scheduler 322 places the twitch packet at the beginning of the queue in a twitch queue step 408. Any special handling requirements such as bundling or compression are also determined in step 404, and resolved in step 408. In step 410 the queue manager 324 checks whether the twitch rate exceeds the leaky bucket algorithm rate which buffers the transmission rate of data from the queue. If the twitch rate does exceed the leaky bucket rate, the twitch packet is placed in the regular transmission queue. If not, the twitch packet is transmitted using the twitch channel reserved by twitch reservation process 318. The twitch packet is then sent over data link 336 from router 304 to the next downstream hop.

RSVP Extension

In one embodiment of the present invention, the twitch reservation protocol is implemented as an extension to the Resource Reservation Protocol (RSVP). RSVP reserves network resources within links comprising hosts and routers along a network and thereby guarantees a minimum quality of service for transmission of data along the network. Within the RSVP protocol, the minimum size and the maximum size of a datagram is specified within a traffic specification. Current versions of RSVP do not reserve greater resources for packet sizes of a specified small size, nor do they control the queue order of packets depending on their packet size. The present invention extends the RSVP protocol by providing a mechanism whereby packets of a specified small size are queued in a priority higher than regular datagram and control traffic.

There are two fundamental RSVP message types RESV and PATH. Each receiver host sends RSVP reservation request (RESV) messages upstream toward the senders. These messages must follow exactly the reverse of the paths the data packets will use, upstream to all the sender hosts included in the sender selection. They create and maintain reservation state in each node along the paths. RESV messages must finally be delivered to the sender hosts themselves so that the hosts can set up appropriate traffic control parameters for the first hop. Each RSVP sender host transmits RSVP PATH messages downstream along the routes provided by the routing protocols following the paths of the data. These PATH messages store pass state in each node (router) along the way. This PATH state includes at least the unicast IP address of the previous hop node which is used to route RESV messages hop by hop in the reverse direction.

Figure 5:
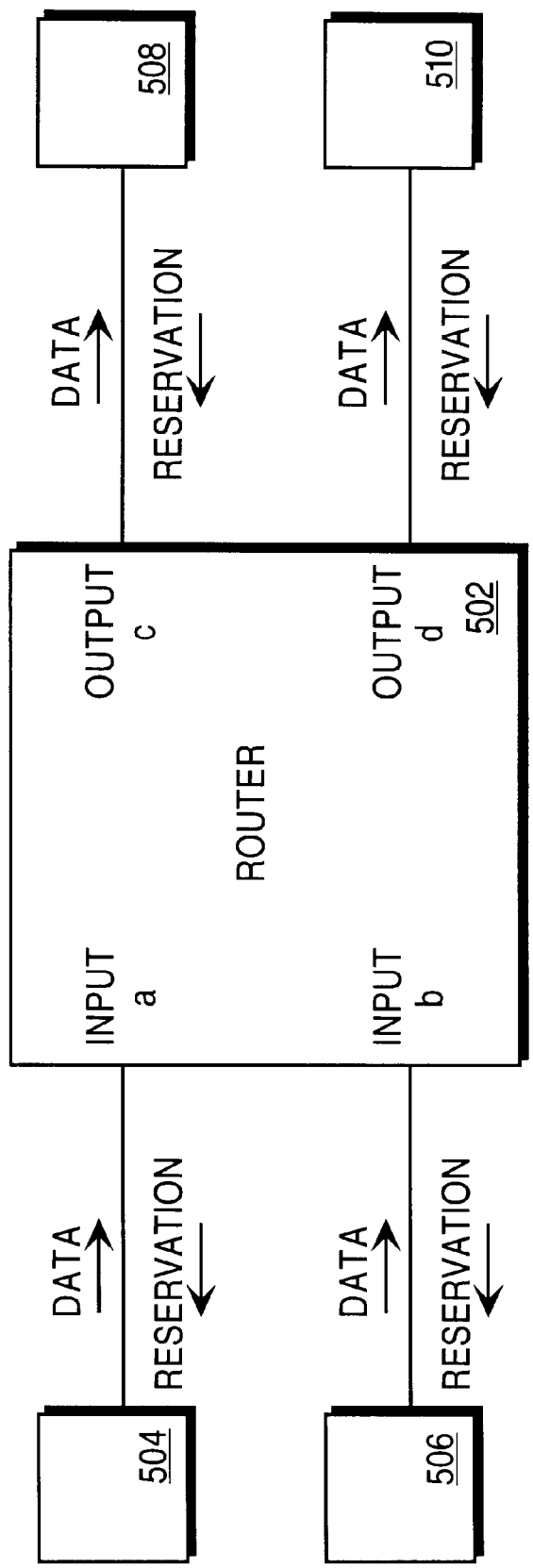
FIG. 5 illustrates a twitch enabled router for use in a multi-cast network configuration.

FIG. 5 illustrates a router which implements RSVP protocol with the twitch protocol extension. Router 502 is a multi-cast router which includes two inputs labeled a and b and two outputs labeled c and d. Upstream hops, which could be either upstream routers or a sending host, are numbered 504 and 506. Downstream hops, which could either be downstream routers or a receiving host, are numbered 508 and 510. Downstream hops, whether they are routers or the receiving host, send reservation requests RESV packets upstream to output nodes c and d. Router 502 propagates these reservation requests to the upstream nodes 504 and 506. Upstream nodes 504 and 506 transmit data to ports a and b in router 502. Router 502 transmits these data packets to downstream nodes 508 and 510 through output nodes c and d. Thus, reservation requests are transmitted upstream through router 502 from nodes 508 and 510 to nodes 504 and 506. Data nodes are transmitted in the opposite direction from nodes 504 and 506 through router 502 to downstream nodes 508 and 510.

Figure 6:
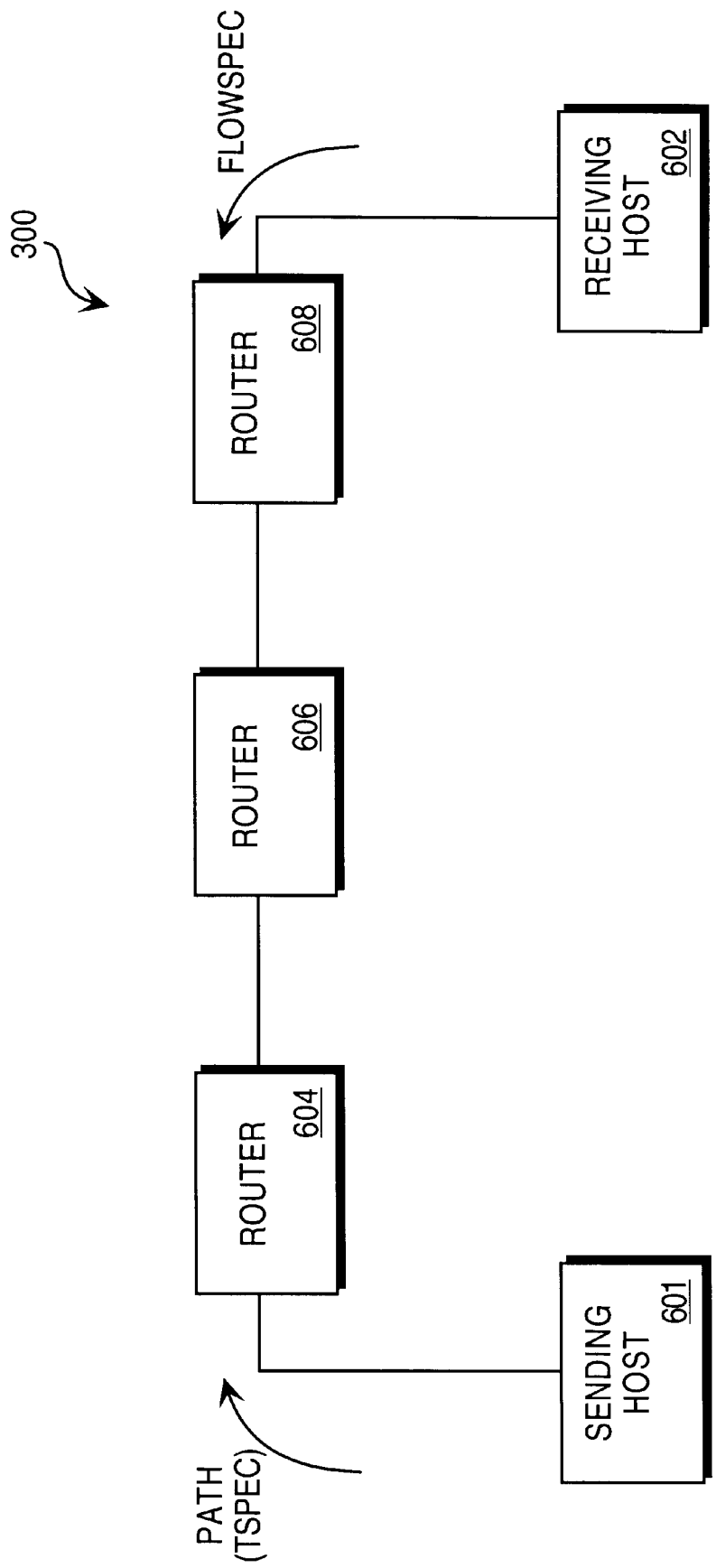
FIG. 6 illustrates a network containing twitch enabled routers according to one embodiment of the present invention.

FIG. 6 illustrates a network comprising sending host 601 and receiving host 602 coupled to three routers 604, 606 and 608. FIG. 6 illustrates a network in which each router is connected to a single upstream hop and a single downstream hop. However, FIG. 6 also applies to a multi-cast network in which each router may be connected to multiple upstream or downstream hops. In the multi-cast network, the routers implement the architecture illustrated in FIG. 5 for router 502. Note that the network illustrated in FIG. 6 is identical to the network illustrated in FIG. 1 except that network element 108 of FIG. 1 comprises a single router, which is router 606 in FIG. 6.

The sending host 601 transmits PATH messages across the network to the receiving host 602. The PATH messages contain information required by the receiving host 602 to allow the receiving host 602 to make bandwidth reservation requests to nodes along the network. These bandwidth reservation requests are sent by the receiving hosts 602 to the sending host 601 in the form of reserve (RESV) messages which propagate along the same path to the sending host 601 as taken by the PATH messages. Note that RSVP is designed for soft state—that is, RESV messages must be sent by the receiving message at regular intervals in order to maintain (i.e., "refresh") the reservation. In an alternative embodiment, the twitch extension for the RSVP protocol may be implemented for hard state—that is the network maintains a reservation status for twitch channels until a teardown message is sent to re-establish a non-reserved state.

The RSVP PATH message consists of a TSPEC object which carries the traffic specification generated by each data source within an RSVP session. This is transported unchanged through the network and is delivered to both intermediate network routers and the receiving application. The RSVP FLOWSPEC object carries reservation request information generated by receiving hosts. The information in the FLOWSPEC flows upstream toward data sources. It may be used or updated at intermediate network elements before arriving at the sending application. Thus, sending hosts specify the traffic they expect to generate in TSPEC objects and send them within PATH messages across the network to the receiving host. In turn, the receiving host sends network reservation requests within the FLOWSPEC to each node between the receiving host and the sending host. The nodes between the receiving host and sending hosts respond to the FLOWSPEC object sent by the receiving host by reserving the specified bandwidth requested.

The RSVP sender TSPEC object carries information about a data source's generated traffic. In one embodiment, the present invention adds fields to the existing sender TSPEC that is specified in the Version 1 of the Functional Specification of RSVP. Table 1 illustrates the existing sender TSPEC object as extended for twitch reservations. Field 1 comprises the fields within the existing TSPEC and may contain fields for token bucket rate, token bucket size, peak data rate, minimum policed unit, and maximum packet size. In the present invention, fields are added to specify the twitch packet size and the twitch packet rate with a binary field which specifies whether the traffic has twitch characteristics or is a twitch packet. This field would be decoded by classifier 310 and classifier 320 as a twitch packet within twitch reservation processes 308 and 318. The twitch RSVP TSPEC also includes a field which specifies the maximum number of messages to be sent within a session. Thus, the twitch RSVP TSPEC requests a reservation for N messages, each message to have a size of n bytes of data. A typical twitch packet may be an 8 byte word which encodes a command to move a character or to fire a weapon. The twitch RSVP TSPEC requests a reservation for N number of such packets in t units of time of each packet to be of size n.

TABLE 1

TSPEC Object With Twitch Extension

| 1 | Standard RSVP TSPEC Header |
| 2 | Standard RSVP TSPEC Fields |
| 3 | Twitch Header |
| 4 | Maximum Twitch Data Rate |
| 5 | Maximum Twitch Packet Size |

The RSVP FLOWSPEC object carries information necessary to make reservation requests from the receivers to the network and to each link router along the network. This includes an indication of which quality of service control service is being requested and the parameters needed for that service. The quality of service control service requested is indicated by the service number in the FLOWSPEC's per service header. In one embodiment of the present invention, receivers send a twitch FLOWSPEC object. The twitch FLOWSPEC object contains fields which extend the standard RSVP FLOWSPEC object for reservation of the twitch channel within nodes along a network.

The standard RSVP FLOWSPEC object is illustrated in Table 2 and may include fields for token bucket rate, token bucket size, peak data rate, minimum policed unit and maximum packet size. The twitch extension to the RSVP FLOWSPEC adds fields for number of twitch packets sent within a unit of time that is the twitch data rate the maximum number of twitch packets and the maximum twitch packet size. The twitch reservation process 308 and 318 within twitch enabled routers and hosts as illustrated in FIG. 3 reserve twitch channels in response to the twitch RSVP FLOWSPEC as was requested by the twitch RSVP TSPEC. Note that within the RSVP specification, several different qualities of service may be requested by the RSVP FLOWSPEC. The present invention is intended to work with any of these specified qualities of service, such as guaranteed service, and controlled load services.

TABLE 2

FLOWSPEC Object With Twitch Extension

| 1 | Standard RSVP FLOWSPEC Header |
| 2 | Standard RSVP FLOWSPEC Fields |
| 3 | Twitch Header |
| 4 | Maximum Requested Twitch Rate |
| 5 | Maximum Requested Twitch Packet Size |

Figure 7:
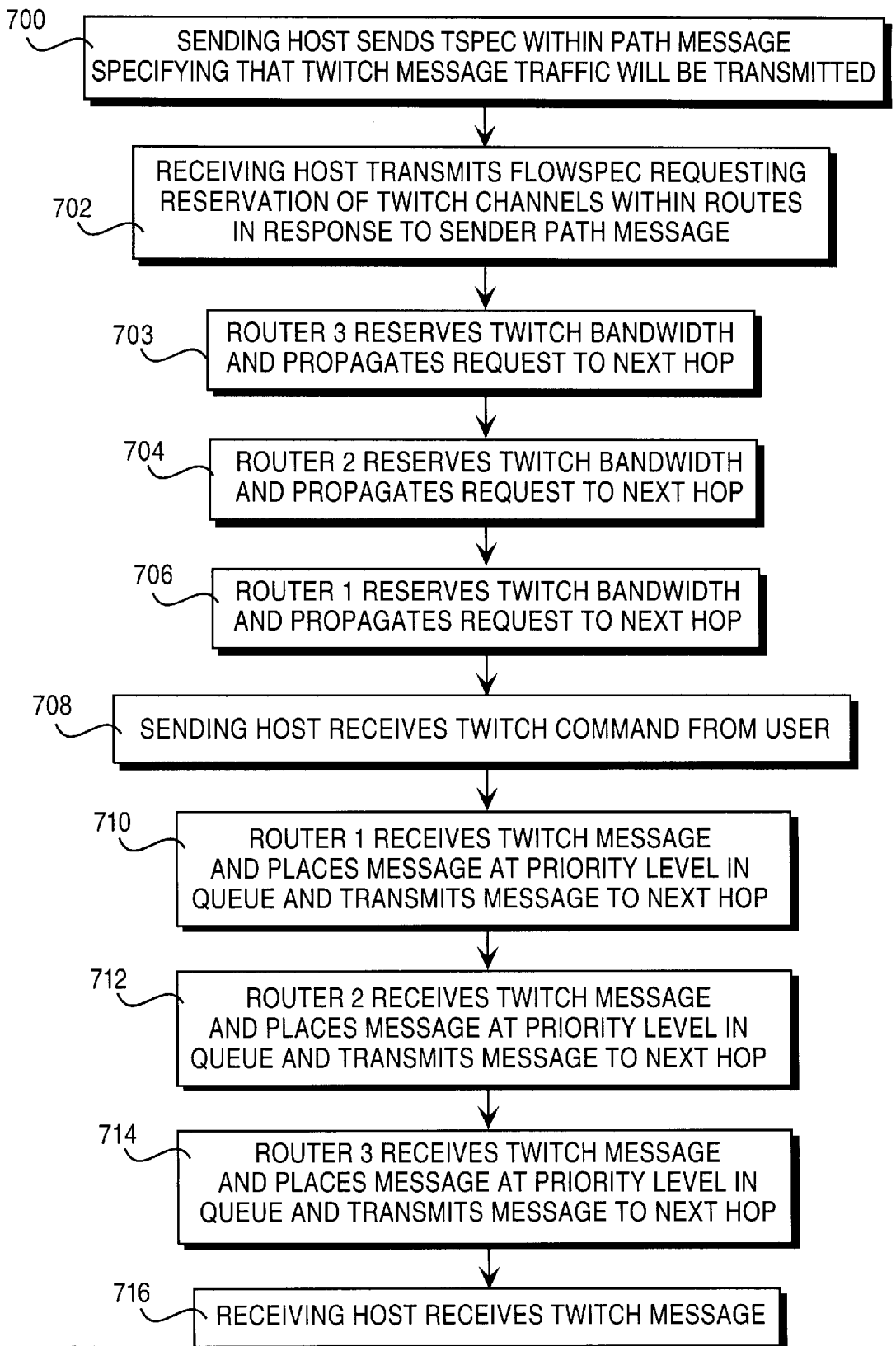
FIG. 7 is a flow chart illustrating the transmission of a twitch packet through a twitch enabled network.

FIG. 7 is a flow chart illustrating the process of reserving a twitch channel within nodes of a network and propagating a twitch message generated by a twitch application on a sending host to a receiving host along the network illustrated in FIG. 6. In step 700, the sending host 601 sends a TSPEC within a PATH message specifying that twitch message traffic will be transmitted to the receiving host 602. The TSPEC within the PATH message is propagated from the sending host 601 along the network through the network routers to the receiving host 602. In response to the PATH message the receiving host 602 transmits a FLOWSPEC requesting reservation of twitch channels within routers along the network, step 702. The reservation request matches the requested resources within the TSPEC from the sending host. The RSVP protocols do not affect the routing algorithms which are implemented within the hosts and the routers.

In step 703, router 608 receives the FLOWSPEC from the receiving host 602 and reserves twitch bandwidth in accordance with the request within the FLOWSPEC, and propagates the request to the next hop. The reserved resources could be a proportion of the bandwidth within the router or the number of memory buffers within the router. The FLOWSPEC is propagated from router 608 to router 606. In step 704, router 606 reserves twitch bandwidth in accordance with the FLOWSPEC request and propagates the request to the next hop. In step 706, router 604 receives the FLOWSPEC request from router 606 and reserves twitch bandwidth in accordance with the FLOWSPEC request. Router 604 then propagates the request to the next hop.

In step 708 the sender host receives a twitch command from the user. In the context of a twitch game, this could be input from a joystick or similar input device to invoke an action command on the sending host. In step 710, router 604 receives the twitch message from sending host 601, places that message at a priority level in its transmission queue and transmits the message to the next hop. At step 712, router 606 receives the twitch message from router 604, places the message at a priority level in its transmission queue and transmits the message to the next hop. At step 714, router 608 receives the twitch message from router 606 places that message at a priority level in the transmission queue, and transmits the message to the next hop, step 714. At step 716 the receiving host 602 receives the twitch message from router 608 decodes the parameter encoded within the twitch message and executes the instruction corresponding to the parameter. Because the twitch message has been sent from the sending host 601 to the receiving host 602 at a priority level within each of the routers along the path, the twitch message has propagated with a minimum of delay and a minimum of latency, thus enhancing the playability of the action game and the realism of the simulation.

Thus, a method and apparatus have been described for the transmission of low bandwidth messages across a network with reduced latency. Although the present invention has been described with reference to specific exemplary embodiments, it will be evident that various modifications and changes may be made to these embodiments without departing from the broader spirit and scope of the invention as set forth in the claims. Accordingly, the specification and drawing are to be regarded in an illustrative rather than a restrictive sense.

What is claimed is:

1. A method of transmitting data over a network path comprising a plurality of nodes, said method comprising:

classifying said data which have minimal bandwidth requirements in a first classification as first data in a first node on said network path;

assigning a higher priority to said first data relative to other data without minimal bandwidth requirements for transmission;

transmitting said first data before transmitting said other data; and maintaining said higher priority for said first data by said plurality of nodes of said network path.

2. A method of transmitting data over a network path according to claim 1, wherein the step of maintaining said higher priority further comprises:

receiving said first data at a second node on said network path;

determining said first classification for said first data;

further assigning a higher priority to said first data relative to further said other data for transmission; and transmitting said first data from said second node before transmitting further said other data.

3. A method of transmitting data over a network path according to claim 1 further comprising the step of reserving resources within said plurality of nodes on said network path.

4. A method of transmitting data over a network path according to claim 3 wherein said step of reserving resources within said plurality of nodes includes the step of implementing a resource reservation protocol between each of said plurality of nodes.

5. A method of transmitting data over a network path according to claim 2 wherein said first node is a source host, and said second node is a network router, and said first node generates data having minimum bandwidth requirements from a twitch game application executed on said first node.

6. A method of transmitting a data packet over a network, said network comprising a plurality of network devices connected by a connection medium, said method comprising:

reserving network resources within said network devices using a first network protocol;

reserving a subset of said network resources within said network devices using a second network protocol; and transmitting said data packet from one of said network devices to a second of said network devices using said second network protocol, said second network protocol placing and maintaining said data packet at a first priority level in a data queue utilized by said first network protocol.

7. A method as in claim 6, wherein said step of reserving network resources within said network devices comprises the step of sending a first message from one of said plurality of network devices to at least one of the remainder of said plurality of network devices.

8. A method as in claim 7, wherein said first network protocol is a resource reservation protocol, and wherein said first message is a resource reservation request.

9. A method as in claim 7, wherein said step of reserving a subset of said network resources within said network devices comprises the step of sending a second message from one of said plurality of network devices to at least one of the remainder of said plurality of network devices, said second message containing fields which define characteristics associated with said data packet.

10. A method as in claim 7, wherein said second network protocol is an extension of said first network protocol, and said step of reserving a subset of said network resources includes the step of defining one or more data parameter fields within a predetermined field associated with said first message.

11. A method as in claim 10, wherein the step of reserving a subset of network resources further includes the steps of:

defining the number of bits contained within said data packet;

defining the number of data packets to be transmitted within a unit of time; and defining one or more special handling requirements for the transmission of said data packets.

12. A method as in claim 11, wherein said step of defining special handling requirements includes at least one of the following steps:

bundling a predetermined number of data packets to be transmitted concurrently over said network;

compressing said data packet prior to transmission over said network; or reducing the reserved subset of network resources in correspondence with said number of bits contained within said data packet and said number of data packets to be transmitted.

13. A method of executing a command over a network, said network comprising a first computer, a second computer, and a plurality of network devices coupled between said first computer and second computer, said method comprising:

classifying said command as having minimal bandwidth requirements;

reserving network resources within said network devices using a network protocol; and transmitting said command from said first computer to at least one of said plurality of network devices using said network protocol, said network protocol placing and maintaining said command at a predetermined priority level in a data queue utilized by said at least one of said plurality of network devices.

14. A method as in claim 13 wherein said network protocol includes means for defining a first protocol message, said first protocol message including one or more header fields and a message parameter field.

15. A method as in claim 14 wherein said message parameter field includes a message parameter subfields for specifying characteristics associated with one or more data packets encapsulated within said command.

16. A method as in claim 15 wherein said characteristics include the size of said one or more data packets, the transmission rate of said one or more data packets, and predefined functions defining the transmission of said data packets, said predefined functions including bundling a plurality of said data packets for concurrent transmission, and compressing said one or more data packets prior to transmission.

17. A device for transmitting and receiving messages on a network, the device comprising:

a processor; and a memory coupled to the processor, the memory having stored therein instructions which, when executed by the processor, cause said device to:

generate data having minimal bandwidth requirements;

classify said data as having minimal bandwidth requirements;

assign a higher priority to said data relative to other data without minimal bandwidth requirements for transmission; and transmit said data before transmitting said other data.

18. A device as in claim 17, wherein said instructions further cause said device to reserve resources within said plurality of nodes on said network.

19. A device for transmitting and receiving messages on a network, the device comprising:

a processor; and a memory coupled to the processor, the memory having stored therein instructions which, when executed by the processor, cause said device to:

receive data over said network from a second device on said network;

classify said data as having minimal bandwidth requirements if said second device has classified said data as having minimal bandwidth requirements;

assign a higher priority to said data relative to other data without minimal bandwidth requirements for transmission; and transmit said data from said device before transmitting said other data.

20. A memory containing a sequence of instructions, said sequence of instructions being executable on a processor, and wherein execution of said sequence of instructions by said processor causes said processor to perform the steps of:

generating data, said data having minimal bandwidth requirements;

classifying said data as having minimal bandwidth requirements;

assigning a higher priority to said data relative to other data without minimal bandwidth requirements for transmission; and transmitting said data before transmitting said other data.

21. A memory containing a sequence of instructions, said sequence of instructions being executable on a processor, and wherein execution of said sequence of instructions by said processor causes said processor to perform the steps of:

receiving data, said data having minimal bandwidth requirements;

determining a classification for said data;

assigning a higher priority to said data relative to other data without minimal bandwidth requirements for transmission; and transmitting said data from before transmitting said other data.

* * * * *